Oct. 28, 1930.   D. DUNWOODIE   1,779,805
SPLINE TEETH
Filed March 1, 1923   2 Sheets-Sheet 1

INVENTOR
DAVID DUNWOODIE
BY
ATTORNEY

Oct. 28, 1930.   D. DUNWOODIE   1,779,805
SPLINE TEETH
Filed March 1, 1923   2 Sheets-Sheet 2
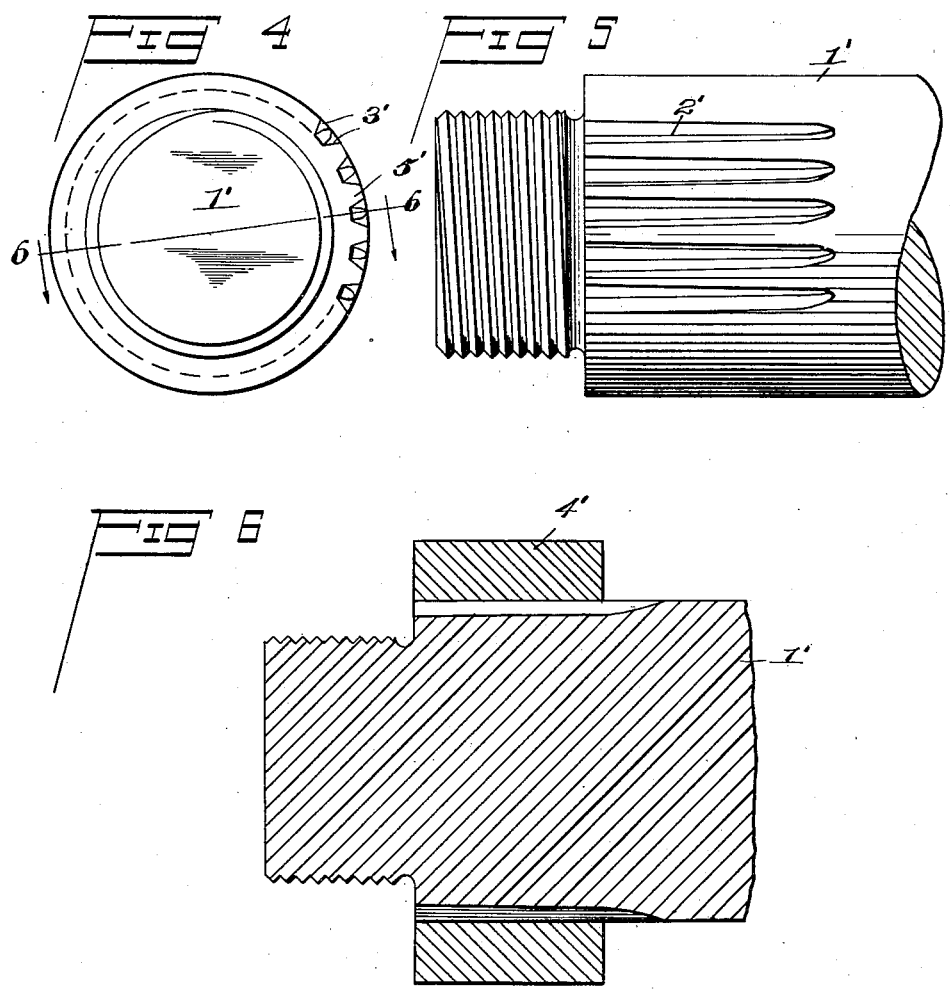
INVENTOR
DAVID DUNWOODIE
BY
ATTORNEY Patented Oct. 28, 1930

1,779,805

UNITED STATES PATENT OFFICE

DAVID DUNWOODIE, OF DAYTON, OHIO

SPLINE TEETH

Application filed March 1, 1923. Serial No. 622,100.

This invention relates to a new form of spline for coupling together a shaft and a driven member such as used in automobile transmissions of the selective type and in various other mechanisms where splines may be used and the object of the invention is to provide a spline which may be more easily and accurately made and constructed and which will be stronger than those heretofore known.

Further objects will be more fully set forth in the attached specification and claims:

In the drawings:

Fig. 4 is an end view of a modification of my invention;

Fig. 5 is a side elevational view of Fig. 4 showing the slight tapered groove grossly exaggerated; and Fig. 6 is a cross-sectional view taken on the line 6—6 of Fig. 4 showing the outside member, having normally an inner bore of constant diameter, in section and pressed fitted onto the inside member.

Figure 2:
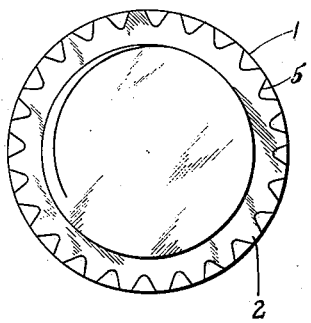
Fig. 2 is an end elevation of the inside spline member.
Figure 1:
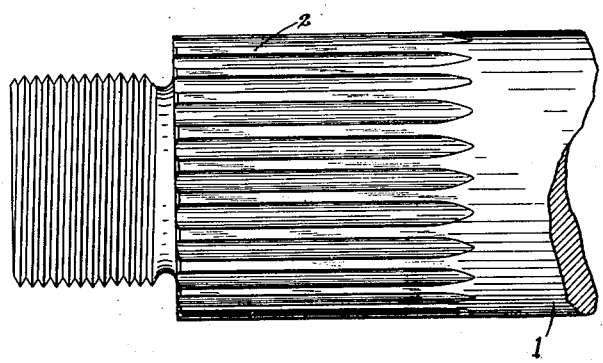
Fig. 1 is a plan view of a shaft showing the spline teeth.

A satisfactory spline fitting or shaft has not been available. Splined shafts were defective because a perfect centering of the shaft and hub made by the known methods was practically impossible. The S. A. E. spline which is formed by cutting slots on a shaft leaving splines with straight sides parallel to the radial lines from the center has several disadvantages. It is difficult to obtain a good fit between this type of spline shaft and hub. The accuracy of this method is dependent to a great extent upon the accuracy of three bearing surfaces. It is well known that the form of cutter used in cutting S. A. E. splines, especially when of the concentric relieved type cannot be ground satisfactorily after hardening. It is furthermore difficult to obtain an accurate relationship of the three cutting faces and keep them true. The slightest amount of wear on any one of the cutting faces of this type of cutter will effect the relationship of the groove and spline. Its accuracy cannot, therefore, be assured; hence this process of cutting splines is not under absolute control.

With my type of spline, however, a good fit between the shaft and hub is simply and accurately obtained. Since the type of cutter used in cutting the grooves to form my spline necessitates but two cutting faces that are easily held in constant relationship, it is comparatively more easily and satisfactorily ground after hardening and slight wear on the cutting faces would necessitate but a slightly deeper cut, and hence has little, if any, effect on the relationship of the splines and grooves. This process of cutting splines being under the control of the operator, greater accuracy than was heretofore possible is obtained with the result that better fits and inter-changeability of parts is made possible. It is well known that with the S. A. E. type of spline half the splines are actually driving, whereas in my device all the splines carry their share of the driving load and due to the fact that these driving faces are angularly disposed, there is a tendency of the hub always to remain concentric with the shaft when under load. Concentricity of the S. A. E. spline under load is practically impossible.

It is furthermore well known that in any spline shaft the distance between the splines must be maintained rigidly in order to prevent looseness between the shaft and hub members which have a sliding fit. As the distance between the spline in the S. A. E. type when using the concentric relieved type of cutter is a function of the depth of cut and as the bottom of the grooves between the splines must be accurately shaped and located with respect to the center of the shaft in order to obtain accurate centering of the shaft and hub members, it will readily be seen that any discrepancy in the depth of cut will have a corresponding effect upon the fit and centering between the members. Whereas, with my spline a slight discrepancy in the depth of cut has no effect upon the centering due to the self-centering characteristics of the angular driving faces.

Referring to the drawings in which similar reference numerals indicate corresponding parts, 1 is a shaft having at one end thereof a portion of constant diameter provided with spline teeth 2, which engage the corresponding teeth 3 of the hub or outside member 4 which is to be coupled to the shaft 1. The angles of the grooves and teeth of the outside member are similar to the angles of the grooves and teeth of the inside member, the included angle of the teeth 3 being the same as the included angle of the grooves on the shaft. The outside diameter of the shaft 1 and the inside diameter of the bore of the part 4 are constant throughout the length of the splined portion. The angles of the grooves and teeth of the outside member are equal to the angles of the teeth and grooves respectively of the inside member, the included angle of the teeth being the same as the included angle of the grooves on the shaft. The teeth 2 are formed as shown with flat sides 5 engaging with the flat sides 6 of the outside teeth.

The spline shaft and outside member shown in the drawings have twenty-four teeth each, regardless of the diameter of the shaft, and the angle between the sides 5, 5 of the teeth is 45°. The angle between the sides 6, 6 of the teeth 3 is 60°. Both the teeth 2 and 3 are shown as formed with arcuate roots 7 and 8, and are cut and arranged as to leave the vertices of the projections flat in order to insure the two parts engaging at or on the sides of the grooves and projections only.

Figure 3:
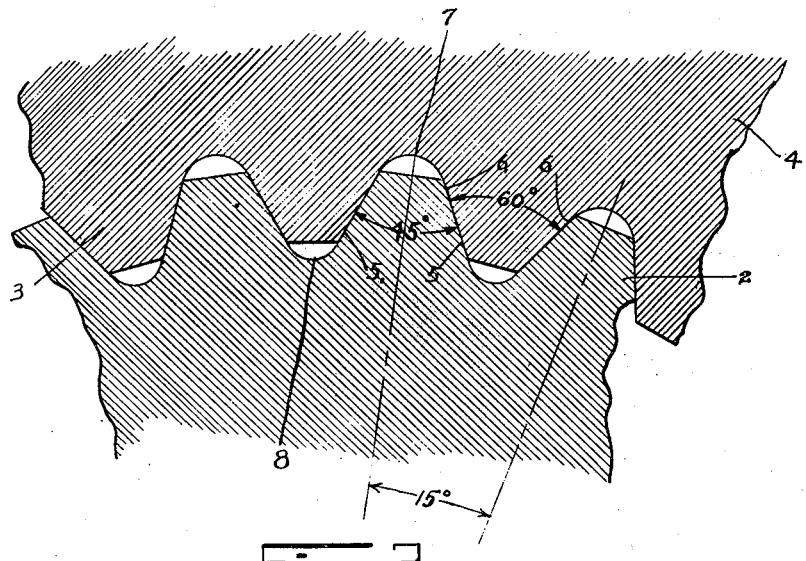
Fig. 3 is an enlarged transverse section of Fig. 2 showing parts of both spline members.

It is to be understood that by having 24 teeth, there will be one tooth for every 15 degrees around the circumference and by using straight sided cutters of 60° and 45° for cutting the teeth, the work may be more easily set up preparatory to cutting the teeth. It will be seen by referring to Fig. 3 by inspection, that since the included angle subtended by adjacent teeth is 15°, the angle between the sides of a tooth of the inner member added to the angle subtended by the said adjacent teeth of the inner member will equal the angle included between the sides of the teeth of the outside member. This may quite readily be proved geometrically and is readily obvious.

When it is desired to have a spline made regardless of the diameter or length of the spline, the mechanic merely takes up an ordinary 60° cutting tool which is a standard tool for milling, grinding, or shaping machines, and this standard tool is used for cutting the teeth on the inside member, also for cutting a broach for the outside member. The cutters may be easily sharpened or reground and may be sharpened as often as desired without affecting their serviceability. After being resharpened, the cutters may be easily inspected and checked, the even 45° and 60° angles, and the straight sides of the cutters rendering this an easy matter. Furthermore the broach also can be recut or reground and used as a smaller size broach an indefinite number of times without loss of material and with a saving of some of the more expensive operations.

I have found that when a press fit is desired, it is preferable in some instances to cut the grooves on the shaft or inside member 1' to be splined so that the bottoms of the grooves 2' and consequently their sides 3' are slightly angularly disposed with respect to the axis of the shaft, the bore of the outside member 4' being of constant diameter. The grooves between the teeth 5' of the inside member 1' are cut deeper at one end of the spline than at the other end by gradual withdrawal of the cutter or by raising the center of one end of the material being cut a few ten thousandths of an inch toward the cutter. It will therefore be apparent that one thousandth of an inch difference in the centers of the cutter and shaft from the beginning to the end of the cutting stroke will produce one thousandth of an inch clearance or taper at the tapered end due to the even 60° angle of the groove, thus making the calculation as well as the assembly easier. The pitch of this taper formed by having the bottoms of the grooves at a slight angle from the horizontal varies from a fraction of a thousandth part of an inch to several thousandths predetermined by conditions and nature of the work together with materials used in the length of the splined part of the shaft. In general the pitch of the taper of the groove is substantially the same as, or smaller than the degree of extension of the hub member when stretched to its elastic limit. The pitch at the inner end of the tapered groove is the increase in the distance from the axis of the shaft at that point over the distance from the shaft axis to the tapered surface at the end of the shaft. Since the outside member is provided with a straight broached bore of constant diameter, the inside member being of constant diameter, but provided with a series of tapered grooves, a pressed fit in the power transmitting sides of the teeth will be obtained when the outside member is forced onto the inside member. One operation, therefore, may cut or machine the tooth and the taper. Press fits may be obtained with my spline in the usual and well known manner. When the spline parts are assembled in the case of a press fit obtained as above described or in the usual way and in the case of a sliding fit where the depth of the grooves of the shaft and outside members is uniform throughout the length of the splined portion, the slides or faces of the teeth are in engagement practically their entire area.

If one of the spline parts is of softer metal than the other, it may be desirable to alter the depth of feed of the tool without changing the diameter of the shaft, the number of teeth or the 45° and 60° angles. In this way it is very easy to obtain a fatter tooth for the softer metal where the added strength is desired. This feature is quite easily and accurately obtained in a spline constructed as set forth.

In some cases, as in the attachment of a propeller of an aeroplane to its shaft, where the propeller tends to pull itself out of the shaft, the spline is made at a slight helical angle and the helical pitch used to counteract this tendency.

It will be understood that the outside member 4 mounted on the splined shaft 1 may be a gear, wheel, propeller, or any one of various other devices whose center has to coincide accurately with the central axis with the shaft on which it is carried and that the fit between the members will be a sliding fit or a press fit, depending upon whether the outside member is intended in operation to slide upon the shaft or whether the member is mounted at a fixed point in the length of the splined portion of the shaft.

While it is desirable to have twenty-four teeth on the spline members with the included angles of the grooves and teeth on the shaft member 60° and 45° respectively, this relationship in carrying out my invention is not absolutely necessary. My invention contemplates broadly any modification of a multiple spline fitting in which the angles of the grooves are 60° for any predetermined number of projections, the projections having flat angularly disposed sides lying in planes parallel or substantially parallel to the axis of the fitting; the grooves having flat or arcuate bottoms lying parallel or substantially parallel to the axis of the shaft.

I am aware that my invention is capable of various modifications and I do not desire to be limited to the invention illustrated in the drawing and described in the specification, except as defined by the appended claims.

I claim:

1. In a device of the class described, a shaft provided with a cylindrical portion, an outside member provided with a cylindrical bore, receiving said shaft twenty-four intermeshing teeth on both said cylindrical portion of the shaft and the interior of said member for connecting the same, all of said teeth having flat sides, the included angle between the sides of each tooth on the shaft being 45° and the included angle between the sides of each tooth on said member being 60°.

2. In a straight spline coupling, an inside and an outside toothed member, the outside member having a bore and receiving the inside member said teeth having interengaging flat sides and each tooth being shaped substantially in the form of a V, the depth of the tooth forming grooves of only one of said members, being slightly greater at one end of the spline than at the other, whereby when the outside member is mounted on the inside member a press fit is provided for the members.

3. In a straight spline coupling, an inside and an outside member, the outside member having a bore receiving the inside member 24 intermeshing teeth on each of said members for connecting the same, all of said teeth having flat angularly disposed sides, the included angle between the sides of each tooth on the inside member being exactly 45° and the included angle between the sides of each tooth on the outside member being exactly 60°, the depth of the tooth forming grooves of only one of said members being slightly greater at one end of the spline than at the other, whereby when the outside member is fixed to the inside member a press fit is provided for the members.

4. In a straight spline coupling, inside and outside toothed members, said outside member receiving said inside member said teeth having interengaging flat sides and each tooth being shaped substantially in the form of a V, the depth of the tooth forming grooves of said inside member being slightly greater at the outer end of the spline than at the inner end, the grooves in the outside member being parallel to the axis thereof, whereby when the outside member is splined onto the inside member a press fit is provided for the members.

5. In a device of the class described, a shaft member of constant diameter, and an outside member having a bore and receiving said shaft member, each member having a series of grooves and projections for connecting the same, all of said projections having flat sides angularly disposed with respect to each other, the angle of each groove in the one member being 60° for any predetermined number of projections on said member and the angle of each projection in the other member being 60°.

6. A shaft with V-shaped integral splines having flat side faces forming V-shaped grooves, the included angles of the splines and grooves being 45 degrees and 60 degrees respectively.

7. A multiple splined fitting of the class described having a straight portion of constant diameter, said portion being provided with a plurality of V-shaped projections and V-shaped grooves, adapted to mesh with complementary grooves and projections, respectively of an outside member, the included angle of the grooves being 60 degrees for a predetermined number of projections.

8. A shaft having a straight portion provided with integral projecting splines, said splines being provided with non-parallel side faces and with angular grooves between them, the angle of the grooves being substantially 60 degrees.

In testimony whereof I affix my signature.

DAVID DUNWOODIE.